US012639334B2

(12) United States Patent
Sundin et al.

(10) Patent No.: US 12,639,334 B2
(45) Date of Patent: May 26, 2026

(54) DATA STRUCTURE SYNCHRONIZATION WITH WEBHOOKS

(71) Applicant: Plaid Inc., San Francisco, CA (US)

(72) Inventors: Nicholas Sundin, New York, NY (US); Royce Kok, New York, NY (US); Jiaqi Mei, San Francisco, CA (US)

(73) Assignee: Plaid Inc., San Francisco, CA (US)

( * ) Notice: Subject to any disclaimer, the term of this patent is extended or adjusted under 35 U.S.C. 154(b) by 0 days.

(21) Appl. No.: 18/318,382

(22) Filed: May 16, 2023

(65) Prior Publication Data

US 2023/0367789 A1 Nov. 16, 2023

Related U.S. Application Data

(60) Provisional application No. 63/364,790, filed on May 16, 2022.

(51) Int. Cl.
*G06F 16/27* (2019.01)
*G06F 16/23* (2019.01)

(52) U.S. Cl.
CPC ........ *G06F 16/273* (2019.01); *G06F 16/2358* (2019.01); *G06F 16/2379* (2019.01)

(58) Field of Classification Search
CPC ............... G06F 16/273; G06F 16/2358; G06F 16/2379; G06F 16/24568
See application file for complete search history.

(56) References Cited

U.S. PATENT DOCUMENTS

| | | | | |
|---|---|---|---|---|
| 9,449,346 | B1 | 9/2016 | Hockey et al. | |
| 11,971,876 | B2 * | 4/2024 | Carru | G06Q 30/01 |
| 2013/0159387 | A1 * | 6/2013 | James | G06F 30/394 |
| | | | | 709/203 |
| 2017/0346807 | A1 * | 11/2017 | Blasi | H04L 63/0442 |
| 2018/0253458 | A1 * | 9/2018 | Goyal | G06F 16/23 |
| 2019/0123928 | A1 * | 4/2019 | Aston | H04L 12/185 |
| 2019/0319954 | A1 * | 10/2019 | Chimakurthi | H04L 63/10 |
| 2021/0058404 | A1 | 2/2021 | D'Agostino et al. | |
| 2023/0245124 | A1 * | 8/2023 | Patel | G06Q 20/0855 |
| | | | | 705/64 |

* cited by examiner

*Primary Examiner* — Charles D Adams
(74) *Attorney, Agent, or Firm* — Harrity & Harrity, LLP

(57) ABSTRACT

In some implementations, an aggregation system may receive, from a user device, a registration message. The aggregation system may receive, from a data source, an initial set of structured data. The aggregation system may receive, from the data source and periodically, updates to the initial set of structured data. The aggregation system may transmit, to the user device and via a webhook activated based on the registration message, an indication of each update. The aggregation system may generate, based on each update, a corresponding differential data structure. The aggregation system may transmit, to the user device, each corresponding differential data structure.

20 Claims, 6 Drawing Sheets

400 ⟶

100

135
Request update

140
Differential data structure

Aggregation system

User device

400

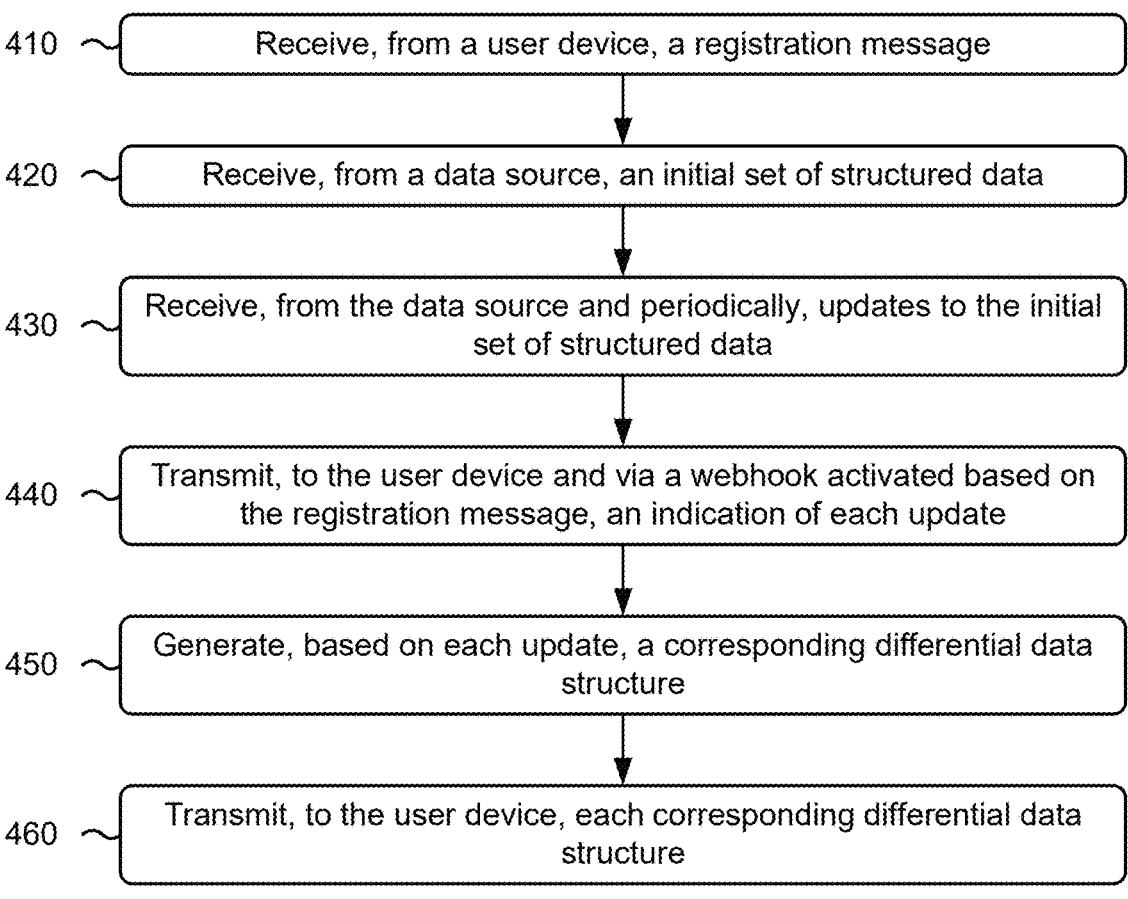

410   Receive, from a user device, a registration message

420   Receive, from a data source, an initial set of structured data

430   Receive, from the data source and periodically, updates to the initial set of structured data 440   Transmit, to the user device and via a webhook activated based on the registration message, an indication of each update 450   Generate, based on each update, a corresponding differential data structure 460   Transmit, to the user device, each corresponding differential data structure

FIG. 4

DATA STRUCTURE SYNCHRONIZATION WITH WEBHOOKS

RELATED APPLICATION

This application claims priority to U.S. Provisional Patent Application No. 63/364,790, filed May 16, 2022, which is incorporated herein by reference in its entirety.

BACKGROUND

Structured data, such as event data and/or transactional data, may be updated over time by addition of new entries (e.g., new events or new transactions), removal of existing entries, and/or modifications to existing entries. For an entry, a corresponding modification may be to a string description, an amount, a date and time, and/or another associated portion of information included in the entry.

SUMMARY

Some implementations described herein relate to a system for data synchronization. The system may include one or more memories and one or more processors communicatively coupled to the one or more memories. The one or more processors may be configured to receive, from a user device, a registration message. The one or more processors may be configured to receive, from a data source, an initial set of structured data. The one or more processors may be configured to receive, from the data source, an update to the initial set of structured data. The one or more processors may be configured to transmit, to the user device and via a webhook activated based on the registration message, an indication of the update. The one or more processors may be configured to generate a differential data structure based on the update. The one or more processors may be configured to receive, from the user device, a request for the update. The one or more processors may be configured to return, to the user device, the differential data structure in response to the request.

Some implementations described herein relate to a method of data synchronization. The method may include receiving, from a user device, a registration message. The method may include receiving, from a data source, an initial set of structured data. The method may include receiving, from the data source and periodically, updates to the initial set of structured data. The method may include transmitting, to the user device and via a webhook activated based on the registration message, an indication of each update. The method may include generating, based on each update, a corresponding differential data structure. The method may include transmitting, to the user device, each corresponding differential data structure.

Some implementations described herein relate to a non-transitory computer-readable medium that stores a set of instructions for data synchronization for a device. The set of instructions, when executed by one or more processors of the device, may cause the device to receive, from a user device, a set of credentials associated with a data source. The set of instructions, when executed by one or more processors of the device, may cause the device to receive, from the data source and using the set of credentials, an initial set of structured data. The set of instructions, when executed by one or more processors of the device, may cause the device to receive, from the data source and using the set of credentials, an update to the initial set of structured data. The set of instructions, when executed by one or more processors of the device, may cause the device to transmit, to the user device and via a webhook, an indication of the update. The set of instructions, when executed by one or more processors of the device, may cause the device to generate a differential data structure based on the update. The set of instructions, when executed by one or more processors of the device, may cause the device to receive, from the user device, a request for the update. The set of instructions, when executed by one or more processors of the device, may cause the device to return, to the user device, the differential data structure in response to the request.

BRIEF DESCRIPTION OF THE DRAWINGS

FIG. 4 is a flowchart of an example process relating to data structure synchronization.

DETAILED DESCRIPTION

The following detailed description of example implementations refers to the accompanying drawings. The same reference numbers in different drawings may identify the same or similar elements.

Structured data, such as event data and/or transactional data, may be updated over time by addition of new entries (e.g., new events or new transactions), removal of existing entries, and/or modifications to existing entries. For an entry, a corresponding modification may be to a string description, an amount, a date and time, and/or another associated portion of information included in the entry. However, checking for updates to the entries consumes processing resources at a user device and is time-consuming. Additionally, the user device consumes processing resources in determining which updates are associated with new entries and which updates are associated with existing entries.

Some implementations described herein provide for remote tracking of updates to a set of structured data, such as event data and/or transactional data, and pushing the updates to a user device via webhooks. For example, an aggregation system may leverage faster networking power as compared with updating the set of structured data user-side. Additionally, the aggregation system helps the user device conserve processing resources and reduce latency by updating the set of structured data faster and more efficiently.

Figure 1A:
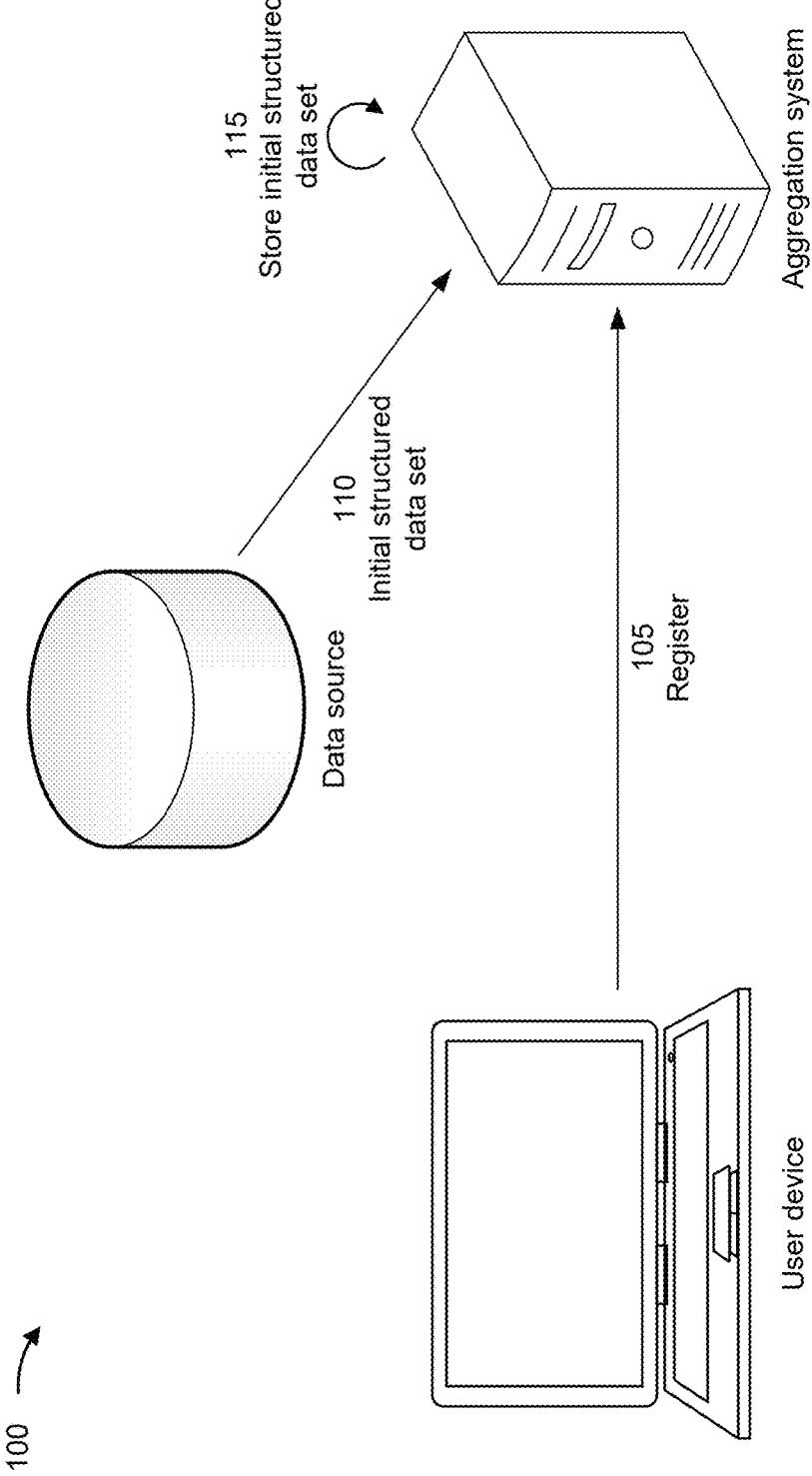
FIGS. 1A-1C are diagrams of an example implementation relating to data structure synchronization.
Figure 1B:
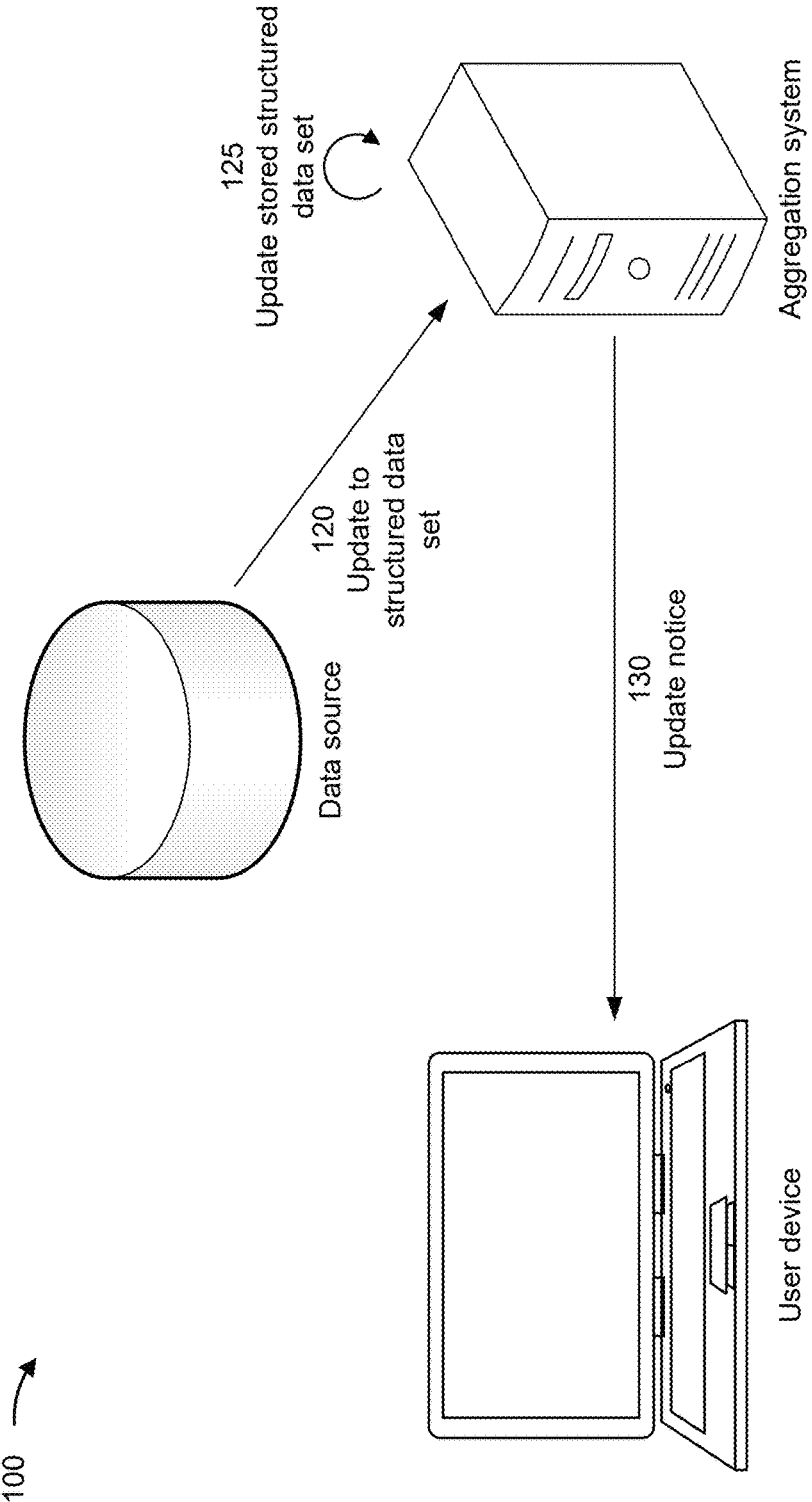
Figure 1C:
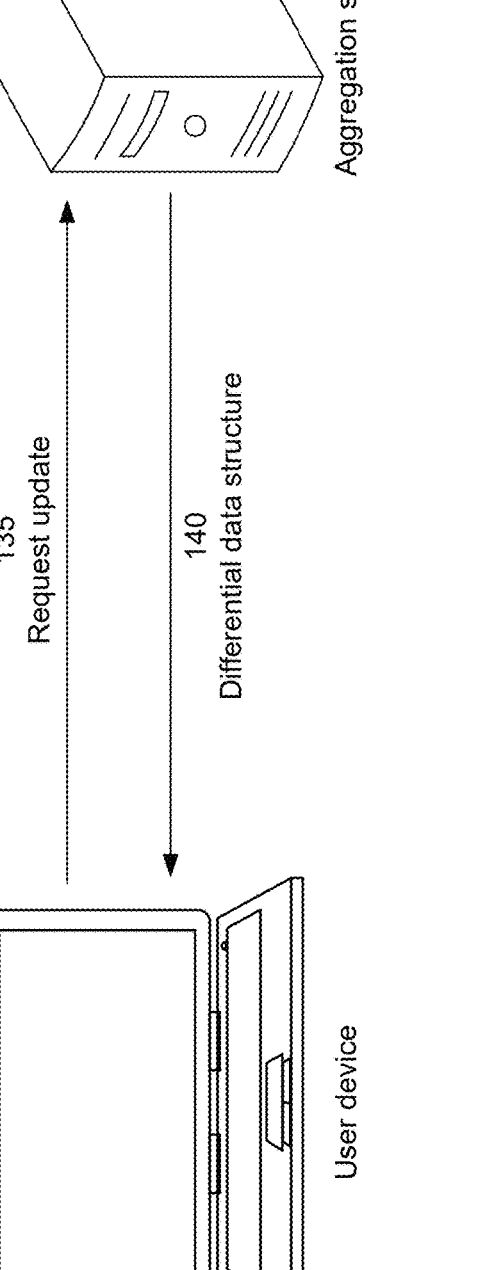

FIGS. 1A-1C are diagrams of an example 100 associated with data structure synchronization. As shown in FIGS. 1A-1C, example 100 includes an aggregation system, a user device, and a data source. These devices are described in more detail in connection with FIGS. 2 and 3.

As shown in FIG. 1A by reference number 105, the user device may transmit, and the aggregation system may receive, a registration message. In some implementations, the user device may perform an initial call to an application programming interface (API) provided by the aggregation system. For example, the user device may perform a call to an API associated with a /transactions/sync endpoint. In some implementations, the registration message may include a set of credentials associated with the data source, such as an access token, a username and password, and/or another type of access credentials. For example, the user device may include an access_token parameter that encapsulates a token associated with the user device and that authorizes the user device to receive structured data (e.g., linked to an account associated with the data source). The token may have been generated (e.g., by the aggregation system and/or the data source) and provided to the user device to use in API calls. The token may be based on a secret (e.g., a private key) generated by, or at least associated with (e.g., via a key distribution center (KDC)), the user device.

Using the set of credentials, the aggregation system may receive an initial set of structured data from the data source, as shown by reference number 110. For example, the aggregation system may transmit a request to the data source (e.g., including the set of credentials) and receive the initial set of structured data in response (e.g., using an API call and response and/or a hypertext transfer protocol (HTTP) request and response). Alternatively, the data source may be configured to periodically update the aggregation system (e.g., as described below) including a first transmission of the initial set of structured data. The aggregation system may store the initial set of structured data, as shown by reference number 115. In some implementations, the aggregation system may use an encrypted storage and/or another type of secure storage for the initial set of structured data. The aggregation system may use a local storage (e.g., a memory controlled by the aggregation system) and/or a storage that is at least partially external (e.g., logically, physically, and/or virtually) to the aggregation system.

In some implementations, the aggregation system may additionally return the initial set of structured data to the user device. For example, the aggregation system may respond to the registration message with the initial set of structured data. Alternatively, the initial set of structured data may be returned during a first iteration of the process shown by FIGS. 1B and 1C, as described in connection with reference number 130. For example, the user device may transmit a request in response to an initial firing of a webhook, and the aggregation system may return the initial set of structured data in response to the request (e.g., as an alternative to a differential data structure, but only in response to a first response to a first indication via the webhook).

Although described in connection with the aggregation system receiving the initial set of structured data in response to the registration message, the aggregation system may alternatively receive the initial set of structured data in response to a request from an additional user device. For example, the additional user device may transmit an authorization for the aggregation system to the data source, and the aggregation system may receive the initial set of structured data based on the authorization. Accordingly, the set of credentials may be provided by the data source to the additional user device and/or the aggregation system. Additionally, or alternatively, the set of credentials may be generated by the aggregation system and associated with the initial set of structured data.

As shown in FIG. 1B by reference number 120, the aggregation system may receive an update to the initial set of structured data from the data source. For example, the aggregation system may (periodically) transmit a request to the data source (e.g., including the set of credentials, as described above) and may (periodically) receive updates to the initial set structured data in response. Alternatively, the data source may be configured to periodically transmit updates to the aggregation system. The update may include a new entry for the set of structured data, a removed entry from the set of structured data, and/or a medication to an entry within the set of structured data. The aggregation system may update the stored initial set of structured data, as shown by reference number 125. The aggregation system may use a local storage (e.g., a memory controlled by the aggregation system) and/or a storage that is at least partially external (e.g., logically, physically, and/or virtually) to the aggregation system.

The aggregation system may additionally determine differences between the initial set of structured data and the update from the data source. Accordingly, the aggregation system may generate a differential data structure capturing the update (e.g., indicating added entries, removed entries, and changes to existing entries).

Accordingly, as shown by reference number 130, the aggregation system may transmit an indication to the user device via a webhook. As used herein, a "webhook" refers to a hypertext transfer protocol (HTTP) callback that is event-triggered. For example, the webhook may be activated via the registration message described above. The webhook may include a SYNC_UPDATES_AVAILABLE webhook. In some implementations, the aggregation system may additionally use the webhook to provide the initial set of structured data to the user device. For example, the aggregation system may push the initial set of structured data to the user device such that the user device can receive updates thereafter.

In some implementations, the indication may identify which entries, in the initial set of structured data, are associated with the update. For example, the indication may include an identifier (e.g., an alphanumeric identifier, such as item_id) associated with each entry that has changed (since an initial pull of the initial set of structured data or since a previous update was transmitted to the user device).

Therefore, the user device may request the update to the initial set of structured data based on the notice from the webhook, as shown in FIG. 1C by reference number 135. The user device may transmit, and the aggregation system may receive, the request in response to the indication from the aggregation system. In some implementations, the user device may perform a new call to the API provided by the aggregation system. For example, the user device may perform a new call to the API associated with a/transactions/ sync endpoint. In some implementations, the request may include the set of credentials (e.g., as described above). Additionally, in some implementations, the user device may indicate a quantity of entries to receive (e.g., using a count parameter). For example, the user device may request only one update even though multiple updates are available. Additionally, or alternatively, in some implementations, the user device may indicate a most recent update from the aggregation system. For example, the user device may include an identifier (e.g., an alphanumeric identifier in a cursor parameter) that was received in the most recent update from the aggregation system (e.g., as described below in connection with reference number 140). Accordingly, the aggregation system generates and transmits a differential data structure relative to the most recent update as indicated by the user device.

In response to the request, as shown by reference number 140, the aggregation system may transmit, and the user device may receive, a differential data structure indicating differences between the initial set of structured data and the set of structured data as updated. For example, the aggregation system may have generated the differential data structure as described above in connection with reference number 125. Additionally, or alternatively, the aggregation system may generate the differential data structure relative to the cursor parameter in the request from the user device, as described above in connection with reference number 135. Accordingly, the aggregation system may generate the differential data structure based on the request from the user device.

In some implementations, the differential data structure may include a list of new entries (e.g., in an added array), a list of deleted entries (e.g., in a removed array), and a list of modified entries (e.g., in a modified array). The aggregation system may order the entries within each array of the differential data structure by time. For example, the aggregation system may order the entries according to ascending datetime of most recent modification. Thus, the user device may readily add, remove, and update entries in a copy of the structured data maintained by the user device. The user device conserves power, processing resources, and memory overhead relative to retrieving a new copy of the structured data from the data source and determining the differences on its own. In some implementations, the differential data structure may further include an identifier (e.g., an alphanumeric identifier in a cursor parameter) associated with the differential data structure. Accordingly, the user device may include the identifier in a future request, and the aggregation system may generate a new differential data structure relative to the previous differential data structure associated with the identifier.

The operations described in connection with reference numbers 120, 125, 130, 135, and 140 may be performed iteratively. As a result, the aggregation system conserves processing resources at the user device by updating the set of structured data. Additionally, the aggregation system may update the set of structured data faster than the user device and thus reduce latency and increase accuracy.

Although described using one data source, the aggregation system may collate entries (and/or may collate multiple sets of structured data) from multiple data sources. Accordingly, the aggregation system may provide differential data structures associated with multiple sets of structured data to the user device, whether in response to a single request based on a single webhook or in response to multiple requests based on multiple webhooks.

As indicated above, FIGS. 1A-1C are provided as an example. Other examples may differ from what is described with regard to FIGS. 1A-1C.

Figure 2:
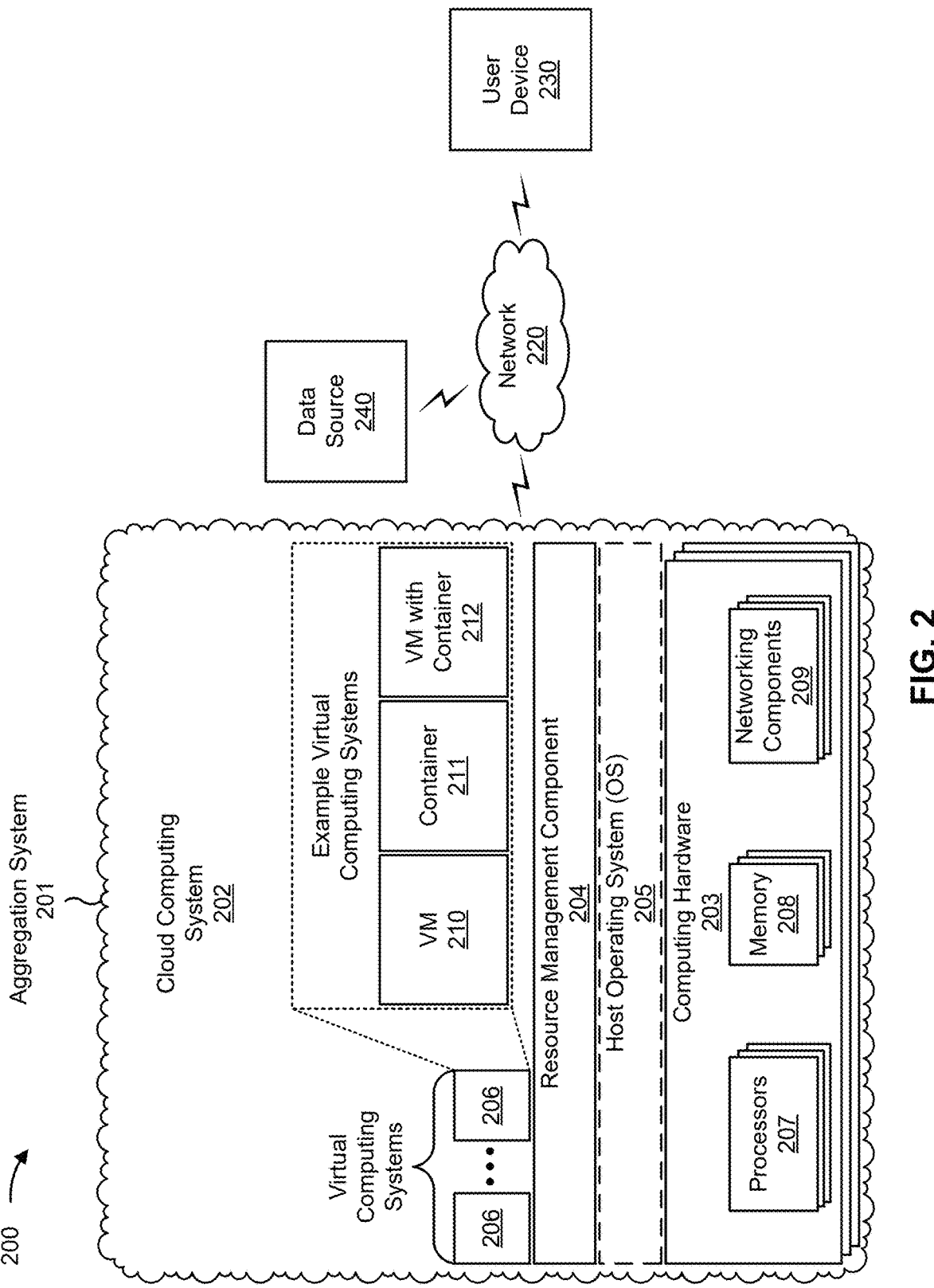
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an aggregation system 201, which may include one or more elements of and/or may execute within a cloud computing system 202. The cloud computing system 202 may include one or more elements 203-212, as described in more detail below. As further shown in FIG. 2, environment 200 may include a network 220, a user device 230, and/or a data source 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the aggregation system 201 may include one or more elements 203-212 of the cloud computing system 202, may execute within the cloud computing system 202, and/or may be hosted within the cloud computing system 202, in some implementations, the aggregation system 201 may not be cloud-based (e.g., may be implemented outside of a cloud computing system) or may be partially cloud-based. For example, the aggregation system 201 may include one or more devices that are not part of the cloud computing system 202, such as device 300 of FIG. 3, which may include a standalone server or another type of computing device. The aggregation system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The user device 230 includes one or more devices capable of receiving, generating, storing, processing, and/or providing information associated with data synchronization, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The data source 240 includes one or more devices capable of receiving, generating, storing, processing, and/or providing information associated with data synchronization, as described elsewhere herein. The data source 240 may include a communication device and/or a computing device. For example, the data source 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 240 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
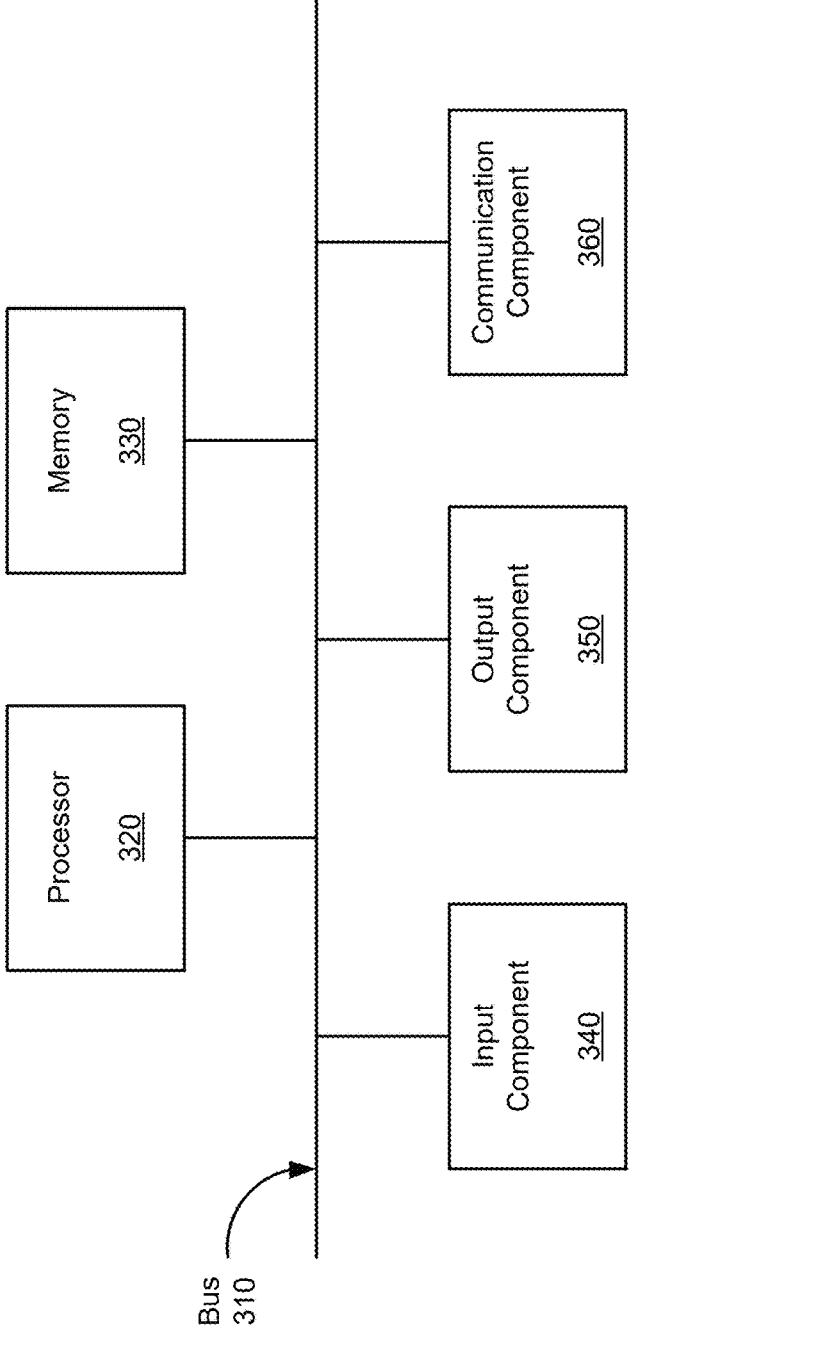
FIG. 3 is a diagram of example components of one or more devices of FIG. 2.

FIG. 3 is a diagram of example components of a device 300, which may correspond to an aggregation system, a user device, and/or a data source. In some implementations, the aggregation system 201, the user device 230, and/or the data source 240 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with data structure synchronization with webhooks. In some implementations, one or more process blocks of FIG. 4 may be performed by the aggregation system 201. In some implementations, one or more process blocks of FIG. 4 may be performed by another device or a group of devices separate from or including the aggregation system 201, such as the user device 230 and/or the data source 240 Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a user device, a registration message (block 410). As further shown in FIG. 4, process 400 may include receiving, from a data source, an initial set of structured data (block 420).

As shown in FIG. 4, process 400 may include receiving, from the data source and periodically, updates to the initial set of structured data (block 430). As further shown in FIG. 4, process 400 may include transmitting, to the user device and via a webhook activated based on the registration message, an indication of each update (block 440).

As further shown in FIG. 4, process 400 may include generating, based on each update, a corresponding differential data structure (block 450). Accordingly, as shown in FIG. 4, process 400 may include transmitting, to the user device, each corresponding differential data structure (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data synchronization, the system comprising:
   one or more memories; and
   one or more processors, communicatively coupled to the one or more memories, configured to:
   receive, from a user device, a registration message that includes a set of credentials,
   wherein the set of credentials includes an access token that encapsulates a token associated with the user device and that authorizes the user device to receive structured data, and
   wherein the token is generated and provided to the user device to use in an application programming interface call,
   wherein the token is based on a private key associated with the user device;
   receive, from a data source and based on the set of credentials, an initial set of structured data;
   receive, from the data source, an update to the initial set of structured data;
   transmit, to the user device and via a webhook activated based on the registration message, an indication of the update,
   wherein the indication identifies portions of the initial set of structured data that are associated with the update;
   receive, from the user device and based on the indication from the webhook, a request for the update,
   wherein the request includes a parameter that indicates a quantity of entries to receive, and
   wherein the request includes an identifier that was received in a recent update;
   generate, based on the identifier and the parameter, a differential data structure that includes the identifier and a list of entries associated with modifications to the initial set of structured data related to one or more updates associated with the update and relative to the identifier,
   wherein the differential data structure includes a list of new entries in a first array, a list of deleted entries in a second array, and a list of modified entries in a third array; and
   return, to the user device, the differential data structure in response to the request.

2. The system of claim 1, wherein the set of credentials is associated with the data source.

3. The system of claim 1, wherein the one or more processors are configured to:

receive, from an additional data source, an additional initial set of structured data;

receive, from the additional data source, an additional update to the additional initial set of structured data; and generate an additional differential data structure based on the additional update, wherein the additional differential data structure is returned to the user device in response to the request.

4. The system of claim 1, wherein the one or more processors are configured to:

transmit, to the user device, the initial set of structured data.

5. The system of claim 4, wherein the initial set of structured data is transmitted to the user device in response to the registration message.

6. The system of claim 1, wherein the request for the update is received in response to the indication of the update.

7. The system of claim 1, wherein the access token is associated with the initial set of structured data.

8. A method of data synchronization, comprising:

receiving, from a user device, a registration message that includes a set of credentials, wherein the set of credentials includes an access token that encapsulates a token associated with the user device and that authorizes the user device to receive structured data, and wherein the token is generated and provided to the user device to use in an application programming interface call, wherein the token is based on a private key associated with the user device;

receiving, from a data source and based on the set of credentials, an initial set of structured data;

receiving, from the data source and periodically, updates to the initial set of structured data;

transmitting, to the user device and via a webhook activated based on the registration message, an indication of the updates, wherein the indication identifies portions of the initial set of structured data that are associated with the updates;

receiving, from the user device and based on the indication from the webhook, a request for the updates, wherein the request includes a parameter that indicates a quantity of entries, and wherein the request includes an identifier that was received in a recent update;

generating, based on the identifier and the parameter, a differential data structure that includes the identifier and a list of entries associated with the updates related to one or more updates relative to the identifier, wherein the differential data structure includes a list of new entries in a first array, a list of deleted entries in a second array, and a list of modified entries in a third array; and transmitting, to the user device, each corresponding differential data structure.

9. The method of claim 8, wherein each corresponding differential data structure is transmitted based on a corresponding request for the updates.

10. The method of claim 8, wherein the registration message comprises an initial call to an application programming interface (API) associated with the webhook.

11. The method of claim 8, further comprising:

receiving, from an additional data source, an additional initial set of structured data;

receiving, from the additional data source and periodically, additional updates to the additional initial set of structured data; and generating, based on each additional update, a corresponding additional differential data structure, wherein each additional differential data structure is further returned to the user device.

12. The method of claim 8, wherein each update is associated with one or more identifiers of one or more entries that have changed.

13. The method of claim 8, wherein each corresponding differential data structure includes an associated identifier.

14. A non-transitory computer-readable medium storing a set of instructions for data synchronization, the set of instructions comprising:

one or more instructions that, when executed by one or more processors of a device, cause the device to:

receive, from a user device, a set of credentials associated with a data source, wherein the set of credentials includes an access token that encapsulates a token associated with the user device and that authorizes the user device to receive structured data, and wherein the token is generated and provided to the user device to use in an application programming interface call, wherein the token is based on a private key associated with the user device;

receive, from the data source and using the set of credentials, an initial set of structured data;

receive, from the data source and using the set of credentials, an update to the initial set of structured data;

transmit, to the user device and via a webhook, an indication of the update, wherein the indication identifies portions of the initial set of structured data that are associated with the update;

receive, from the user device and based on the indication from the webhook, a request for the update, wherein the request includes a parameter that indicates a quantity of entries, and wherein the request includes an identifier that was received in a recent update;

generate, based on the identifier and the parameter, a differential data structure that includes the identifier and a list of entries associated with the update related to the identifier, wherein the differential data structure includes a list of new entries in a first array, a list of deleted entries in a second array, and a list of modified entries in a third array; and return, to the user device, the differential data structure in response to the request.

15. The non-transitory computer-readable medium of claim 14, wherein the access token is associated with at least one of a key or a key distribution center.

16. The non-transitory computer-readable medium of claim 15, wherein the access token is associated with the initial set of structured data.

17. The non-transitory computer-readable medium of claim 15, wherein the access token was generated by the data source.

18. The non-transitory computer-readable medium of claim 14, wherein the set of credentials comprises a username and a password.

19. The non-transitory computer-readable medium of claim 14, wherein the one or more instructions, when executed, cause the device to:

transmit, to the user device, the initial set of structured data.

20. The non-transitory computer-readable medium of claim 19, wherein the initial set of structured data is transmitted to the user device based on an initial response to the webhook.

* * * * *